United States Patent [19]

Verrando et al.

[11] Patent Number: 4,983,190
[45] Date of Patent: Jan. 8, 1991

[54] PRESSURE-SWING ADSORPTION SYSTEM AND METHOD FOR NBC COLLECTIVE PROTECTION

[75] Inventors: Marcel G. Verrando, Ocala, Fla.; Donald H. White, Homer, N.Y.; Evan E. Koslow, Westport, Conn.; Phillip G. Barkley, Cortland, N.Y.

[73] Assignee: Pall Corporation, East Hills, N.Y.

[21] Appl. No.: 736,479

[22] Filed: May 21, 1985

[51] Int. Cl.$^5$ ....................... B01D 53/02; B01D 39/00
[52] U.S. Cl. .......................................... 55/21; 55/33; 55/58; 55/68; 55/75; 55/389
[58] Field of Search .................... 55/21, 33, 58, 68, 75, 55/389

[56] References Cited

U.S. PATENT DOCUMENTS

| | | | |
|---|---|---|---|
| 2,944,627 | 7/1960 | Skarstrom | 183/4.7 |
| 3,973,931 | 8/1976 | Collins | 55/68 X |
| 4,013,429 | 3/1977 | Sircar et al. | 55/33 |
| 4,026,680 | 5/1977 | Collins | 55/75 X |
| 4,194,891 | 3/1980 | Earls et al. | 55/75 X |
| 4,194,892 | 3/1980 | Jones et al. | 55/75 X |
| 4,329,158 | 3/1982 | Sircar | 55/33 X |
| 4,349,357 | 9/1982 | Russell | 55/21 |
| 4,546,442 | 10/1985 | Tinker | 364/500 |
| 4,594,163 | 6/1986 | Sutt, Jr. | 55/75 X |
| 4,599,094 | 7/1986 | Werner et al. | 55/58 X |
| 4,614,525 | 9/1986 | Reiss | 55/58 X |

FOREIGN PATENT DOCUMENTS 2130897 11/1972 France ...................... 55/33
8402086 6/1984 PCT Int'l Appl. .

OTHER PUBLICATIONS

R. L. Stallings, "Improved Air Filtration System by Adsorption/Desorption Methodology," Research Triangle Institute, Research Triangle Park, N.C. (Sep. 1984).
E. J. Murphy, "Clean Dry Air Systems in Semiconductor Manufacturing," Microcontamination (Aug./Sep. 1984).
"The Pall CDA Air Purification System," Brochure No. PPPC C-200, Pall Pneumatic Products Corporation, Ocala, Florida (May, 1984) 7 pages.
"The Pall ZRO Air System," Product Information Sheet No. 105, Pall Pneumatic Products Corporation, Ocala, Florida (1982) 2 pages.
"The Pall Compressed Air Purification System for Hospitals," Brochure No. HPZ 316, Pall Pneumatic Products Corporation, Ocala, Florida (Jun. 1979) 6 pages.
"PHARM-AIR Purification System," Brochure No. PA-315a, Pall Pneumatic Products Corporation, Ocala, Florida (Jul. 1979) 6 pages.
"LVP-CGMP Quality Compressed Air System," Brochure No. TR-1177, Pall Pneumatic Products Corporation, Ocala, Florida (Jun. 1978) 8 pages.
"The Pall Century Series Dryers," Brochure No. PPPC C-101, Pall Pneumatic Products Corp., Ocala, Florida (Mar. 1984) 20 pages.
"Pall Decade III Heat-less Dryer," Brochure No. DCD-305D, Pall Pneumatic Products Corp., Ocala, Florida (Feb. 1984) 12 pages.
AARADCOM Contact/Purchase Order DAAD05-8-3-D441 (Sep. 16, 1983) (See Item No. 0001 Supplies/Service Desc.) 4 pages.

Primary Examiner—Peter A. Nelson
Attorney, Agent, or Firm—Leydig, Voit & Mayer, Ltd.

[57] ABSTRACT

A pressure-swing adsorber using type 13X (10 Angstrom) molecular sieve is used in lieu of or ahead of an activated or impregnated carbon filter in an NBC collective protection system. The pressure-swing adsorber removes a much wider range of toxic vapors from air than an impregnated carbon bed, is fully regenerable, and has a long service life. In one system for supplying purified air to a shelter, air is compressed by a gas turbine-driven compressor, fed through an aerosol removal system, purified by an industrial-type pressure-swing adsorber using type 13X molecular sieve, filtered by a Super HEPA filter, and expanded to atmospheric pressure in a turbo-generator. In another system for field medical oxygen generation, a compressor is driven by an electrical motor and the purified air is fed to a pressure-swing oxygen concentrator using type 5A molecular sieve.

28 Claims, 4 Drawing Sheets

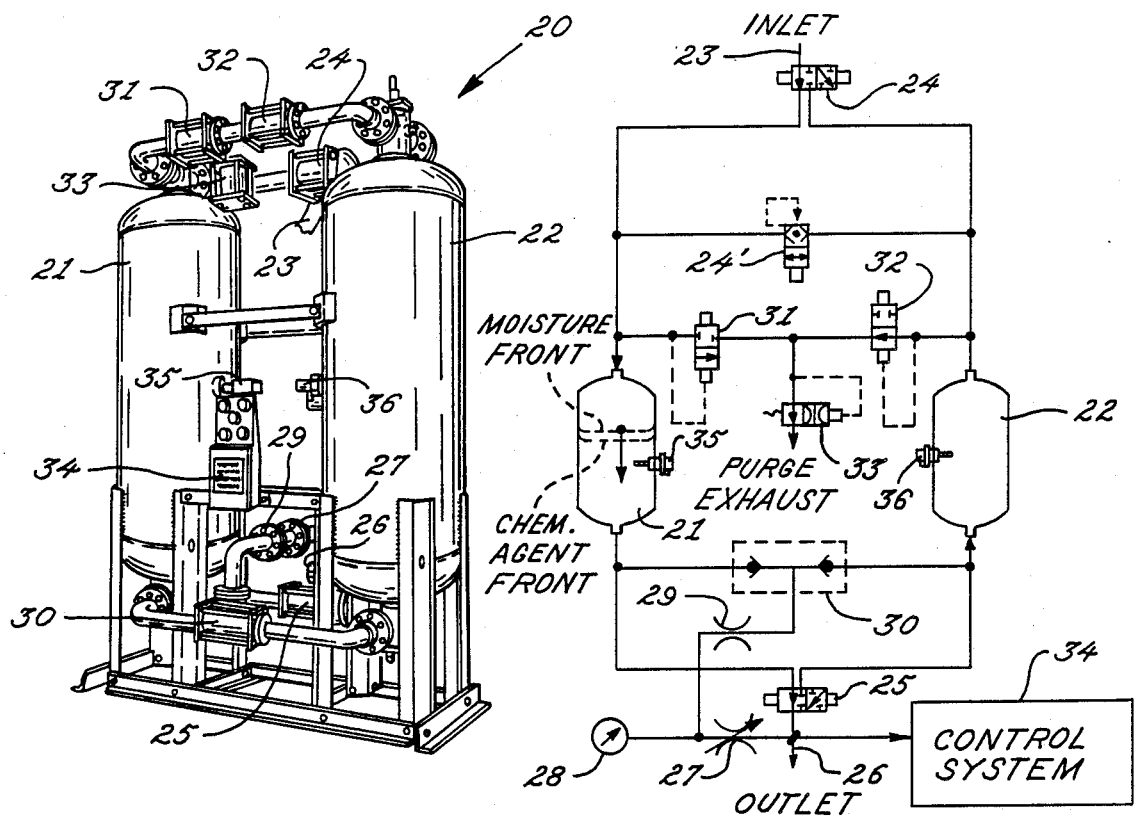
FIG. 1
FIG. 2
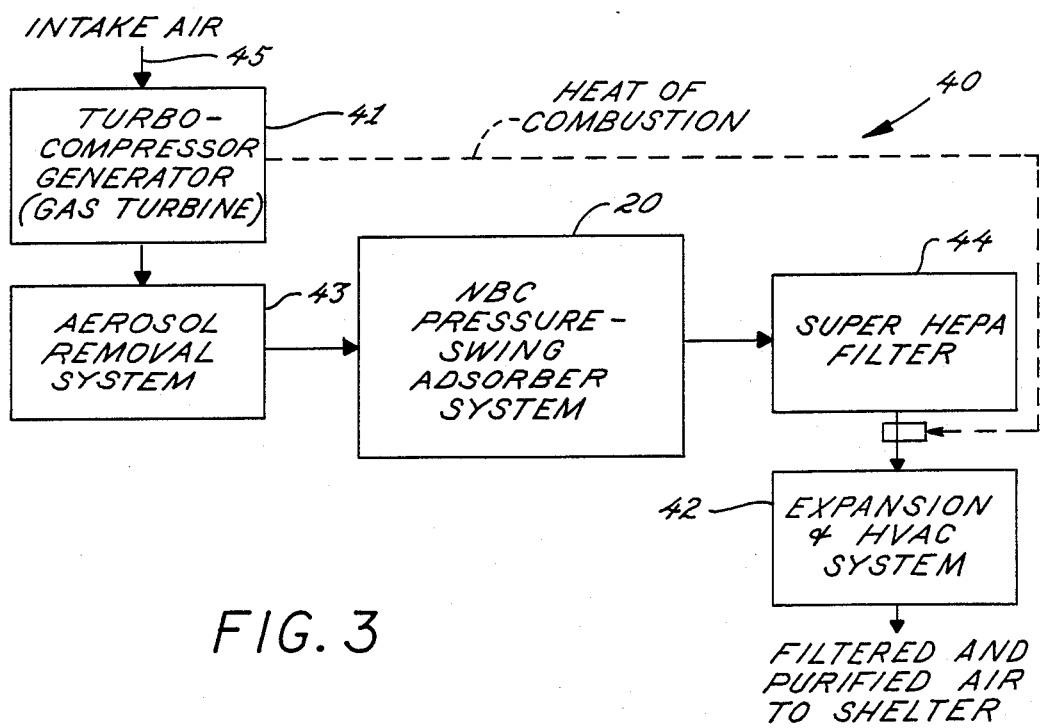
FIG. 3

PRESSURE-SWING ADSORPTION SYSTEM AND METHOD FOR NBC COLLECTIVE PROTECTION

BACKGROUND OF THE INVENTION

1. Field of the Invention

The present invention relates generally to nuclear, biological or chemical (NBC) warfare. The invention relates more particularly to a system for purifying air contaminated by NBC agents for supply to persons inside a shelter, vehicle, or aircraft. More specifically, the invention relates to the further concentration of the purified air into oxygen suitable for use in high-altitude aircraft or for medical purposes.

2. Description of the Related Art

Sorption systems are a well established means of providing effective protection against chemical warfare agents. The sorbent bed through which contaminated air is passed contains highly porous particles which adsorb and retain toxic chemical vapors. First used in World War I, sorbent beds of activated carbon have become the primary defense against the threat of a chemical warfare attack. Impregnants have been added to the activated carbon to increase its sorption capacity for chemical warfare vapors.

Low pressure impregnated carbon bed filters are most suitable for individual protection due to their simplicity. For collective protection, however, they present serious limitations. As they are not regenerable, the impregnated sorbent beds must be replaced at regular intervals which represents a significant logistics support problem. Low pressure filters must be constructed with large cross sectional flow areas in order to limit the particle attrition and sorbent dusting resulting from excessive flow velocities. This results in a poor configuration for installation purposes.

The presently used ASC "Whetlerized" carbon has a limited life in the field. The impregnated carbon beds are easily contaminated and can be rendered non-effective even under non-combat conditions. Moisture and heat can adversely affect the carbon impregnants, and normal atmospheric contaminants such as hydrocarbon vapors and exhaust fumes can poison the sorbent beds prior to a chemical warfare attack.

The major operating advantages of activated carbon, as compared to many proposed alternative means of controlling toxic vapors, is the universality of the present ASC activated carbon (at least when fresh) in handling the present range of acknowledged NBC agents. To provide more complete protection, the activated carbon beds are used in conjunction with a high efficiency particulate air (HEPA) filter or aerosol barrier to remove liquid aerosols, dust particles, biological agents and sorbent fines that may be contaminated with toxic chemicals.

For use in high-altitude aircraft and for medical purposes, the oxygen content of air must be concentrated. A molecular sieve pressure-swing adsorber has been developed for oxygen concentration. See *U.S. Navy Molecular Sieve On-Board Oxygen Generation System—An Update*, NACD-8021-60, Oct. 1978.

Historically, the provision of large quantities of medical grade oxygen has been a critical component in the successful treatment of combat medical casualties. In modern warfare as defined by the Air Land 2000 Doctrine, an increased volume of oxygen will be needed to treat nerve agent casualties via inhalation and respirator therapy. For use in such a highly mobile tactical environment, preferably the oxygen would be concentrated on site, but the ambient air would most likely be contaminated by NBC agents.

SUMMARY OF THE INVENTION

The general aim of the present invention is to provide a sorption apparatus and method possessing a universality of physical adsorption of NBC agents and yet having full regeneration capability.

A specific object of the present invention is to provide an adsorption system that can be routinely operated on a continuous basis for full NBC protection of critical military command posts, medical facilities, pilot ready rooms, operating shelters, and military vehicles, thereby reducing the impact of surprise attacks and sabotage. A related object is to provide such a system that is reasonably compact, energy-efficient, and highly reliable.

Another object of the present invention is to provide a field-medical oxygen generator capable of operating in an NBC contaminated environment.

Briefly, in accordance with an important aspect of the present invention, an NBC collective protective system includes an industrial-type pressure-swing adsorber (PSA) in lieu of an activated or impregnated carbon filter. When provided with an adsorbent such as ten Angstrom molecular sieve, the pressure-swing adsorber is capable of adsorbing a wide range of NBC agents and is capable of complete regeneration over a prolonged service life.

It has been discovered that pressure-swing adsorbers are capable of separating a much wider range of toxic vapors and other contaminants from air than impregnated carbon beds. In industrial applications, systems have been designed to remove carbon dioxide, carbon monoxide, methane, ethane, oil vapors, and nitrous oxides, and they have been used to fractionate air into oxygen and nitrogen. They are also capable of operating continuously over a long period of time. Industrial systems have been known to operate for many years without degradation of performance or effluent quality. Pressure-swing adsorption systems are particularly well suited for installations requiring prolonged, high quality protection such as in continuous-use shelters.

In a pressure-swing adsorber system, both adsorption and desorption are important to the overall performance of the system. The adsorbent must operate to both efficiently adsorb the agents from the flowing air stream and to efficiently and rapidly desorb these contaminants when the system is regenerated by purging at low pressure. The choice of adsorbent is therefore crucial in this respect. Testing and previous experience shows that presently available adsorbents will provide excellent performance in this critical area. Preliminary simulant testing of an NBC pressure-swing adsorber system has demonstrated levels of toxic agent removal more than adequate to meet NBC defensive requirements.

Pressure-swing adsorber devices, therefore, represent a commercially available technology that can effectively operate in a military environment and provide NBC toxic vapor and aerosol protection equal to or greater than that provided by any presently available NBC collective protector, while providing the added benefit of a regenerable sorbent bed.

A complete NBC protection system must address three major contaminant challenges. First, it must remove liquid phase chemical contaminants such as aerosols, water and hydrocarbons. Second, it must also remove vapor phase chemical contaminants including NBC agents, water and hydrocarbons. Third, it must remove particulate chemical agents and contaminants including dust, dirt and biological agents. The pressure-swing adsorber is particularly effective only for removing gaseous components. However, a complete system consisting of a HEPA grade coalescing filter, followed by the pressure-swing adsorber and a super HEPA grade filter, can be sized to quantitatively or qualitatively control virtually all harmful contaminants and agents.

The HEPA coalescing filter removes solid particulate and aerosols including dirt and dust, liquid water and hydrocarbons, and solid or liquid chemical and biological agents. The pressure-swing adsorber is effective for removing the gaseous components passing through the HEPA coalescing filter. Any aerosol passing through the HEPA coalescing filter is likely to be vaporized and adsorbed in the pressure-swing adsorber. Any particulates passing through the HEPA coalescing filter, along with any aerosol passing through the adsorber and any sorbent fines, are eliminated by a superfine HEPA dust filter. Therefore, the combination of the HEPA filters with the pressure-swing adsorber has a synergistic effect on the removal of chemical and biological agents. So pronounced is this effect that 80% to 90% of the chemical vapors are commonly removed prior to entry into the sorbent bed. Consequently, the adsorber can be made smaller.

For added protection, a high-pressure impregnated carbon filter can be placed downstream of the pressure-swing adsorber. In this case, a chemical agent vapor detector placed between the pressure-swing adsorber and the carbon filter could provide an advanced warning of an unexpected chemical agent breakthrough due to a system overload or malfunction.

For oxygen generation, preferably a separate pressure-swing fractionator is placed downstream of the NBC protection system as described above. The fractionator is similar to the adsorber, but uses a different adsorbent and a shorter cycle time. Five Angstrom molecular sieve is the preferred adsorbent for the fractionator. Oxygen concentration requires greater bed volume than the air purification in the adsorber. Separating the oxygen production from the air purification by using two pressure-swing units increases the efficiency of the overall system. This is due to the lower purge and depressurization losses for the adsorber than for the fractionator. The total system size is also reduced by using two separate pressure-swing units.

BRIEF DESCRIPTION OF THE DRAWINGS

Other objects and advantages of the invention will become apparent upon reading the attached detailed description and upon reference to the drawings in which:

FIG. 1 is a perspective view of an industrial-type pressure-swing adsorber suitable for NBC collective protection in accordance with the present invention;

FIG. 2 is a simplified schematic diagram of the pressure-swing adsorber as shown in FIG. 1;

FIG. 3 is a block diagram of an NBC collective protection system in accordance with the present invention for supplying purified air to a shelter;

Figure 4:
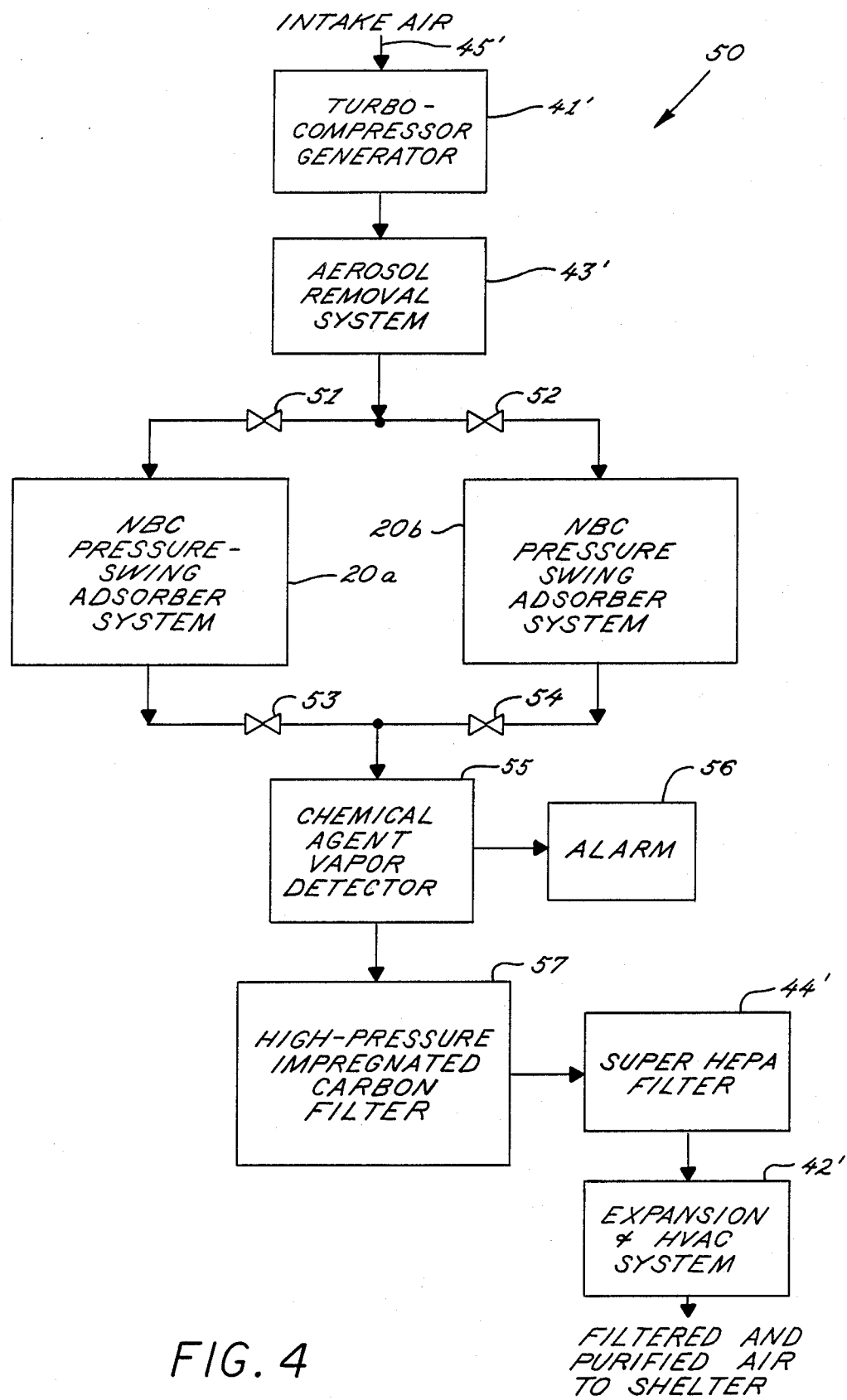
FIG. 4 is a block diagram showing enhancements to the system of FIG. 3 for providing advanced warning of an unexpected chemical agent breakthrough and having an auxiliary pressure-swing adsorber.

While the invention has been described in connection with certain preferred embodiments, it will be understood that the intention is not to be limited to the particular forms of the invention shown, but the intention is, on the contrary, to cover the various alternative and equivalent constructions included within the spirit and scope of the appended claims.

DESCRIPTION OF THE PREFERRED EMBODIMENTS

In accordance with an important aspect of the present invention, an NBC collective protection system includes an industrial-type pressure-swing adsorber provided with an adsorbent selected to adsorb a wide range of NBC agents. Turning now to FIG. 1 of the drawings, there is shown a perspective view of the main components of an industrial-type pressure-swing adsorber generally designated 20. This kind of adsorber has been particularly useful for drying compressed air. In this application the adsorber is commonly known as a "heaterless" dryer. For drying compressed air, an activated alumina desiccant is typically used.

A corresponding schematic diagram of the adsorber 20 is shown in FIG. 2. To provide for regeneration of the adsorbent, the dryer 20 has separate left and right adsorbent beds or chambers 21 and 22 so that when one chamber is undergoing adsorption the other chamber may be regenerated. Pressurized gas including vapor is received on an inlet pipe 23 and is alternately directed by an inlet valve assembly 24 to the left or right chamber where the vapor is adsorbed. Similarly an output valve assembly 25 directs the purified gas to an outlet pipe 26.

In order to regenerate the adsorbent in the other chamber, a portion of the purified gas is expanded to approximately atmospheric pressure through a bleeder valve 27 and the flow is indicated by an associated pressure gauge 28 and orifice 29. This purge flow is directed by a check valve assembly 30 to the chamber selected for regeneration by the opening of a respective one of two exhaust valves 31, 32. When the exhaust valve is first opened its respective chamber is pressurized. A dump flow restrictor 33 limits the purge exhaust flow to a reasonably small rate so that the adsorbent, in the form of beads or pellets, is not "fluidized" due to the opening of the exhaust valve. Fluidizing of the adsorbent is undesirable since adsorbent fines are generated which may clog downstream filters, and in extreme cases the adsorbent beads may be crushed or fragmented.

To further prevent fluidizing of the adsorbent, the adsorbent beads are preferably bonded to one another by a polymeric binding agent such as polyethylene. The binding agent is preferably applied in a three-step process comprising the steps of: (1) preheating the adsorbent beads, (2) mixing the heated adsorbent beads with the polymeric binding material in powdered form, the polymeric binding material comprising from 2 to 5 weight percent, based on the total weight of the mixture, wherein a major portion of the polymeric binding material has particle sizes in the range of from about 8 to about 100 micrometers, to form a mixture comprising particles of polymeric binding material adhered to the adsorbent beads, and (3) applying a pressure from about 0.3 to about 50 psi, while the temperature of the mixture is approximately at the solid-liquid transition temperature of the polymeric binding material, resulting, when the polymeric binding material is cooled, in a self-supporting structure in which the adsorbent beads are immobilized and their adsorbent properties have been retained.

At the end of regeneration the respective exhaust valve 31, 32 is closed. Prior to switching the inlet and outlet valves 24, 25 to bring the regenerated chamber on-line for adsorption, a repressurization valve 24' associated with the inlet valve 24 is opened which permits the chamber having been dumped and regenerated to be repressurized without substantially interrupting the outlet flow of purified gas.

The adsorption and regeneration processes as described above are sequentially controlled by a pneumatic and electronic control system 34 which operates the valves 24, 24', 25, 31, 32 and preferably includes a microcomputer. The control system and the valves are further described in Tinker [U.S. application Ser. No. 444,502 filed Nov. 24, 1982, notice of allowability dated Mar. 20, 1985]herein incorporated by reference.

As described in Tinker, the control system 34 is responsive to respective capacitance probes 35, 36 inserted in the adsorbent beds 21, 22. These probes 35, 36 measure changes in capacitance in direct proportion to the change in dielectric constant of the adsorbent as affected by the water content of the adsorbent. Using the signals available from these probes, the control system can estimate the amount of water adsorbed on the adsorbent at different points.

Ordinarily only water significantly affects the dielectric constant of the sorbent. Water, being a strongly adsorbed substance, displaces other chemicals as its adsorption front moves progressively through the bed. It also recedes as the purge gas proceeds to reverse its travel in the bed.

The position of the moisture front within the adsorbent bed is a position indicator of the adsorption fronts produced by lesser adsorbed substances. Hence a microprocessor-based controller as described in Tinker can check the probe status and reliably give a warning should a mechanical or electrical malfunction occur that upsets the normal probe reading. Specifically, to adapt the control method of Tinker for use in the present invention, the alarm limits (in terms of probe capacitance) and cycle switching thresholds are set more conservatively under the assumption that some NBC agents are displaced ahead of the moisture front and therefore could break through the adsorbent beds ahead of the moisture front.

Conversely, should the probe readings be normal, this indicates that the system is acting in a correct manner. The moisture sensor may be used to supplement information provided by an NBC agent detector, as further described below in connection with FIG. 4. Any deviation from a normal probe signal could be used to safely prevent breakthrough by execution of a control procedure that displays the probable cause of the malfunction, carries out a positive system shutdown, and switches NBC adsorption to an auxiliary system.

For use in an NBC collective protective system, the adsorbent must be chosen to remove a number of different NBC agents. The relevant characteristic of an NBC agent is its molecular size or diameter.

Adsorption is a surface phenomenon operative at the inner or pore surface of an adsorbent particle. There is a considerable difference between the inner or pore surface area and the outer surface area of a typical adsorbent bead. A 1/16 inch diameter bead of molecular sieve adsorbent has an outer surface area of 8 square millimeters. The inner surface area is 2.6 square meters, or about three hundred thousand times the area of the outer surface. Therefore, the inner surface effects are crucial.

Adsorption is also a pore phenomenon affected by the diameter of the pores. The high internal surface area is found inside small pores and therefore is not accessible to gas or vapor molecules having a diameter exceeding the diameter of the pores. In the case of molecular sieves, the pores are, for example, 5 Angstroms (5A) or 10 Angstroms (13×) in diameter. Most CW agents are much larger than 5 Angstroms. Based upon space-filling models constructed using a Fisher-Hirshfelder-Taylor model kit, only agents such as CK and AC should be easily adsorbed (and desorbed on regeneration) on 5 Angstrom molecular sieve. Specifically, the following agents are expected to either be poorly adsorbed on 5 Angstrom molecular sieve or to foul the 5 Angstrom molecular sieve because of the small pore diameter: GA (Tabun), GB (Sarin), GD (Soman), VX (V-agent), HD (mustard gas), HN1 (nitrogen mustard), HN-2 (nitrogen mustard), HN-3 (nitrogen mustard), and PD (phenyldichloro-arsine). On the other hand, these agents should adsorb well (and desorb well upon regeneration) on 10 Angstrom or type 13× molecular sieve, the preferred adsorbent used in the present invention.

For testing purposes, a 200 scfm capacity adsorber using industrial components was supplied to the U.S. Army/CRDC (CRDC purchase order No. D-AAD05-83-M-D441). Upon completion of the simulant testing, live testing at Dugway, Utah is planned. Also, simulant tests using both DMMP (dimethyl methylphosphonate) and chloro-methane were conducted on a fully-instrumented laboratory scale pressure-swing adsorber at the Pall Corporation Laboratories at Cortland, N.Y. Successful results were obtained during these simulant tests. Specifically for a 1000 ppm by weight in flow of the simulants, the concentration of simulant in the effluent was below a quantitative level. In other words, the simulant could not be quantitatively detected in the effluent. For DMMP, the concentration of DMMP in the effluent was less than two parts-per-billion by weight. For chloro-methane, the concentration of chloro-methane in the effluent was less than 0.5 parts per million by weight.

Simulant tests were also run on standard heat-reactivated and heaterless pressure-swing adsorbers manufactured and sold by Pall Pneumatic Products Corporation, 4647 S.W. 39th Avenue, Ocala, Fla. 32674, for industrial purposes. (Heat, preferable applied using microwaves, may aid desorption of certain NBC agents, but the application of heat is expected to reduce the adsorbent lifetime due to fouling of the adsorbent by polymerization.) These tests were run to obtain correlation between dew point and NBC protection. Such a correlation is expected, for example, from the mechanism of moisture front and chemical or NBC agent front advance discussed above. These simulant tests were performed using Linde 13× molecular sieve adsorbent. The simulants were introduced into a model 35HA dryer at 60 psig. Water and DMMP were run using 4 minute "NEMA" switching cycles; chloro-methane (ClMe) was run with a 2 minute "NEMA" switching cycle. Some test runs were also performed using a model 150 DHA "heaterless" dryer. Test results are summarized in Table I. The rows labeled "Meas." are measured values, and the vows labeled "Calc." are computer-generated predictions of the effluent quality. The values labeled "D.P." are dew point temperatures in degrees Fahrenheit.

Both oxygen concentration and NBC protection require a low dew point (very dry) pressure-swing adsorbent effluent. Good CW agent removal accompanies low due point production. Several agents, including GA, GB, GD, and VX, can be

TABLE I

| PSA EFFLUENT QUALITY VERIFICATION | | | | | |
|---|---|---|---|---|---|
| WATER | (1) | (2) | (3) | (4) | (5) |
| Dryer | 35HA | 35HA | 35HA | 35HA | 150DHA |
| Inlet Temp. (deg F.) | 100 | 100 | 110 | 110 | 66.4 |
| Inlet Press. (psig) | 60 | 60 | 60 | 60 | 84.5 |
| Inlet RH | 51.7% | 25.1% | 15.6% | 20.1% | 66.5% |
| Inlet Flow (scfm) | 29.4 | 29.4 | 29.4 | 29.4 | 43.0 |
| Purge Ratio | 1.12 | 1.12 | 1.12 | 1.12 | 4.92 |
| Meas. D.P. | −122 | −122 | −120 | −122 | < −148 |
| Calc. D.P. | −109 | −116 | −117 | −114 | −159 |
| DMMP | (1) | (2) | (3) | ClMe | (1) |
| Inlet Temp. | 100 | 100 | 110 | | 92 |
| Inlet RH | 51.7% | 25.1% | 15.6% | | 18.8% |
| Inlet Flow | 29.4 | 29.4 | 29.4 | | 14.8 |
| Purge Ratio | 1.12 | 1.12 | 1.12 | | 1.08 |
| Inlet Conc. (mg/m$^3$) | 216 | 96 | 84 | | 680 |
| Meas. Outlet ($\mu$g/m$^3$) | 2.2 | 3.0 | 2.4 | | <.5 × 10$^3$ |
| Calc. Outlet | 5.2 | 1.0 | .08 | | .011 × 10$^3$ |

Note:
1 $\mu$g/m = 0.833 ppbw
10$^3$ $\mu$g/m = 0.833 ppmw hydrolyzed on wet adsorbent. As further shown and described below in connection with FIG. 6, oxygen concentrator adsorption beds must be protected from water vapor down to about −100° F. dew point. This is required to assure that chemical agents will be removed to very low concentration levels and will not be hydrolyzed in the oxygen concentrator adsorbent beds.

For water and CW agent adsorption, type 13× molecular sieve is a better adsorbent because the strengths of interactions are of the right magnitude for regenerable adsorption. On the other hand, for oxygen production from purified, dry air, only nitrogen needs to be adsorbed. This is best done on type 5A molecular sieve which interacts more strongly with nitrogen than does 13×. This interaction is just strong enough to remove nitrogen from the air.

Turning now to FIG. 3, there is shown a block diagram of an exemplary NBC pressure-swing adsorber collective protective system generally designated 40 for providing purified air to a shelter (not shown). The system is compatible with the space available within a typical shelter, and in particular the "MER & FBR" sections of a "SCPS-2" shelter.

A modified WR27 turbine-compressor 41 may be used to provide the compressed air and power for the proposed collective protection system 40. The WR27 is designed and manufactured by Williams International of Walled Lake, Mich. Preferably the WR27, which was originally developed for the Navy S-3A Viking anti-submarine aircraft, is modified to provide 800 cfm of compressed air at 75 psia pressure, which is an excellent match to the requirements of the collective protection system 40. Also, an expansion turbine 42 should be added to the WR27 to recapture the energy available from the compressed air exiting the NBC adsorber 20. This energy is recovered and used to drive a high-voltage AC (HVAC) generator 42 that can provide all of the electrical power required to support the shelter. The expansion of the air through this turbine cools the air to provide air conditioning. Heat from the turbine's exhaust is used to control the final temperature of air provided to the shelter, as well as being available to make hot water. The turbine should be electric starter equipped using two (2) 12 V storage batteries (not shown).

The NBC adsorber 20, when integrated in this manner, is capable of supplying all of the utilities required for the shelter. This allows the replacement of the present diesel-generator, heaters, air conditioning, and hot water heating systems from the shelter utility room and recovers a significant space for potential use for other purposes. The NBC collective-protective system 40 should be sufficiently small so that it can be removed from the shelter for service. All major components should be readily accessible for service and the exterior surfaces should be easily decontaminated.

The NBC adsorber system 20 operates in conjunction with an aerosol removal system 43 and a super HEPA filter 44. The compressor intake air 45 is filtered to remove gross particulates that may damage the compressor. This prefilter (not shown) is preferably composed of a panel of small centrifugal air cleaner tubes commonly used in military systems to protect turbine engines. The scavenge air carrying dirt removed from the turbine inlet air is exhausted through a turbine exhaust eductor (not shown) back into the environment along with the turbine exhaust gases. The compressed air from the turbo-compressor is passed through an air-to-air heat exchanger (not shown) and then to the aerosol removal system 43.

In the aerosol removal system 43 the air is first passed through a mechanical separator (not shown) to remove liquid water and aerosols having been condensed in the cooler. A drain valve (not shown) automatically opens periodically to discharge the collected liquids to the exhaust eductor (not shown).

Upon exiting the mechanical separator, the air is passed to a high efficiency coalescing filter (not shown) provided to coalesce and remove oil and water aerosol mists too small to be removed in the separator. This coalescing filter also serves to remove fine agent aerosols and most biological particles. The coalescing filter housing is also drained automatically to the exhaust eductor. At this point in the cycle, virtually all particulates as well as all condensed liquid and aerosol contaminants have been removed. Vapor, however, remains in the filtered air, which is passed to the NBC pressure-swing adsorber system 20.

The NBC pressure-swing adsorber system 20 removes water and CW agent vapors to a safe level to produce clean, breathable, dry air. The vapors of water, hydrocarbons and chemical agents are adsorbed in one of the adsorbent beds and dry pure air passes out of the outlet (26 in FIG. 2) at a pressure only slightly lower than the inlet pressure. This pure air is delivered to a receiver or accumulator chamber (not shown) through a check valve (not shown) and used continuously. A portion of this pure air is used for regeneration purposes as described above, and the purge is exhausted to the engine exhaust of the turbine 41.

The major portion of the pure air generated by adsorber 20 is fed to the Super HEPA after-filter 44. The after-filter, being of Super HEPA grade, removes all biologicals as well as any adsorbent fines from the purified air in order to protect the downstream components from contamination.

Super HEPA grade filters have been available commercially for several years. They are manufactured and sold, for example, by Pall Corporation, 2200 Northern Boulevard, East Hills, N.Y. 11548.

A Super HEPA filter consists of an advance aerosol filter medium consisting of a hydrophobic and oleophobic membrane filter having exceedingly small pores (0.5 $\mu$m absolute as compared to 5–8 $\mu$m absolute for conventional HEPA filter materials).

A membrane having such pores poses an "absolute" barrier to aerosols because it directly intercepts incoming particles and droplets rather than relying upon particle adhesion. The membrane is a synthetic microporous or polymeric membrane such as microporous Nylon or Teflon. The aerosol removal efficiency of such a membrane is many orders of magnitude greater than that of a conventional HEPA filter, and yet, the air flow resistance and dirt capacity of the filter can be made nearly equal to that of the present HEPA materials.

To achieve this, the membrane is combined with a layer of man-made microfibers placed on the upstream portion of the filter medium. These fibers serve as a prefilter to provide enhanced dirt and smoke fouling resistance. Liquids that accumulate upon the surface of the membrane are drawn off through capillary action into this fiber matrix. Low air flow resistance is achieved through the use of a thin but highly uniform membrane structure. Because the membrane is thin, it has only a limited air flow resistance.

Super HEPA materials have been tested against a variety of aerosols. They are expected to provide a level of protection and performance previously unobtainable from conventional materials. In addition, they are expected to defeat advanced penetrating agents and provide a fail-safe defensive barrier.

The air from the Super HEPA filter 44 is heated as described above before being expanded to the shelter operating pressure through the expansion turbine 42.

Turning now to FIG. 4, there is shown a block diagram of an exemplary NBC collective protection system generally designated 50 providing enhanced protection and reliability. As in the system 40 of FIG. 3, intake air 45' is compressed by a turbocompressor generator 41' and filtered by an aerosol removal system 43' in the manner described above. Duplexing valves 51, 52, 53, 54 direct the filtered air to a selected one of two NBC pressure-swing adsorber systems 20a, 20b, the other adsorber system being held in reserve.

The purified effluent from the selected adsorber 20a, 20b is sampled by a chemical agent vapor detector 55. The chemical agent vapor detector 55 is, for example, a portable unit manufactured and sold by Bendix Corp., Environmental & Process Instruments Division, 1400 Taylor Avenue, Baltimore, Md. 21204. In response to detection of chemical agents, an alarm 56 is activated, the effluent flow from the initially selected NBC adsorber is blocked by closing of the respective effluent duplexing valve 53, 54, and effluent flow from the other adsorber is selected by opening the other respective effluent dumping valve 54. After complete regeneration of the adsorbent beds in the initially selected NBC adsorber, both of the effluent duplexing valves 53, 54 may be opened to handle the increased load of chemical agents.

To provide protection when the chemical agent detector 55 senses the presence of chemical agents, the effluent of the chemical agent detector 55 passes through a conventional high-pressure impregnated carbon filter 57 before passing to a Super HEPA filter 44' and an expansion turbine 42' as described above in connection with FIG. 3. In addition to providing temporary surge protection, the carbon filter 57 may preferentially adsorb certain chemical vapor agents that might be poorly adsorbed by the NBC adsorbers 20a, 20b. The NBC pressure-swing adsorbers, however, will ensure that the carbon filter 57 is not heavily loaded during a chemical attack and will have an extended service life.

Figure 5:
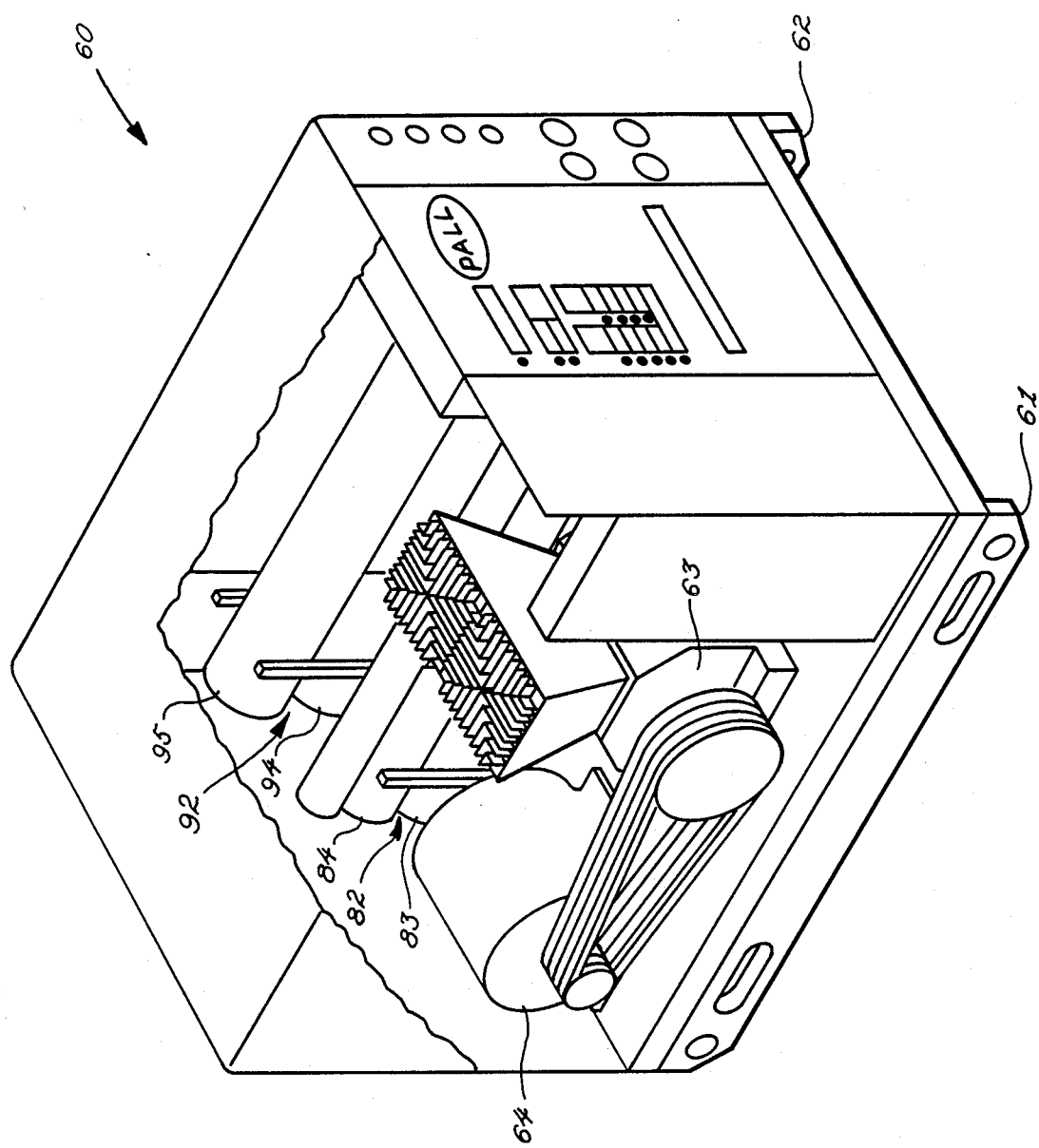
FIG. 5 is a perspective view of a proposed field medical oxygen generator having NBC protection.

Turning now to FIG. 5, there is shown a proposed field medical oxygen generating/distribution system 60. The component arrangement is optimized for compactness to be transportable in the C-130 U.S. Air Force aircraft or in vehicles or trailers used by field Army medical units. The system should be easily operated and monitored by personnel wearing NBC protective clothing. The filters, for example, should be easily changeable. As shown in FIG. 5, the system is mounted on skids 61, 62 for handling by a fork lift. The size of the system 60 is sixty inches in height, fifty inches in width and seventy inches in length. The system includes a compressor 63 driven by an electric motor/64.

Figure 6:
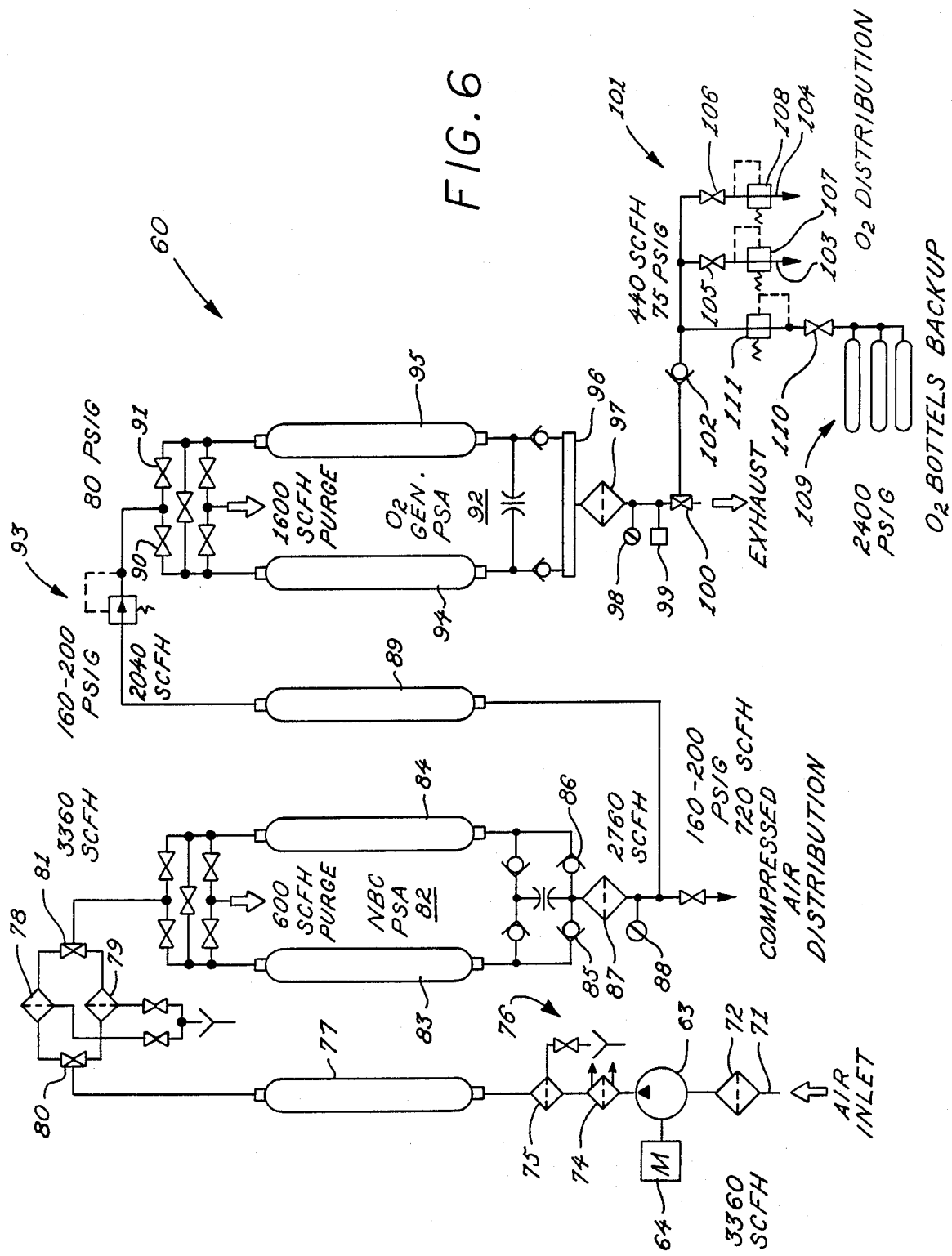
FIG. 6 is a schematic diagram of the field medical oxygen generator shown in FIG. 5.

Turning now to FIG. 6, there is shown a flow diagram for the field medical oxygen system 60. Atmospheric air is drawn into the system through a protected inlet 71 which precludes the entrance of dirt, dust, and rain. The intake air is filtered to remove gross particulates and other materials that may harm the compressor. A reciprocating compressor 63 driven by an electric motor 64 powers the system.

Atmospheric air is drawn into the system through a protected inlet 71 which precludes the entrance of dirt, dust, and rain. The intake air is filtered by a conventional air filter 72 to remove gross particulates and other materials that may harm the compressor 63. The compressor 63 is a low-pressure compressor providing about 3360 scfh 180–200 psig air to the system 60. To remove the heat of compression from the compressed air, the compressor exhaust is passed through an air-cooled aftercooler 74. Liquid water and aerosols condense in the aftercooler 74 and are removed by a separator 75. Liquids removed from the compressed air in the separator are discharged from the system through a drain trap 76.

A receiver 77 damps the pressure pulsations caused by the reciprocating compressor 63. The drain trap 76 is disposed at the lowest level of the receiver 77 for removal of any water that condenses on the walls of the receiver.

High efficiency filters 78, 79 are provided to remove oil and water aerosol mists which are not effectively removed in the separator 75. A duplexing valve system 80, 81 is used to easily change over the high efficiency filters 78, 79, precluding entry of chemical and biological and radiological contaminants during an attack. The high efficiency filters 78, 79 are provided with drain valves 82, 83.

The filtered air is passed to an NBC pressure-swing adsorber generally designated 82 which removes CW agent vapors to safe levels and removes water vapor to below the permissible levels for oxygen concentration. The NBC adsorber 82 is similar to the adsorption system 20 of FIG. 1 except for its, smaller size. The NBC adsorber 82 has narrower adsorption chambers 83 and 84. Due to the lower capacity of the NBC adsorber 82, check valves 85, 86 are used for outlet switching.

The purified air from the NBC adsorber 82 is passed through a super-HEPA filter 87. The super-HEPA filter 87 removes desiccant fines, bacteria, viruses, and all other particulate matter from the purified air. A gauge 88 monitors the air pressure (160 to 200 psig) production site.

The NBC adsorber 82 generates 2,760 SCFH of purified air. About one-fourth of the purified air may be diverted for use as purified air and the remainder used for oxygen concentration. The diverted purified air is distributed to a field hospital shelter (not shown) and tent shelters (not shown) at 160-200 psig. The remainder of the purified air is fed to a receiver 89.

The receiver 89 damps the pressure pulses resulting from the rapid switching of oxygen concentrator inlet valves 90, 91. Before reaching the inlet valves 90, 91, however, the pressure of the air entering the oxygen concentrator 92 is reduced by a regulator 93 to 60 psig in order to optimize oxygen production.

The oxygen concentrator has two chambers 94, 95 of type 5A molecular sieve. As shown in FIG. 5, the oxygen concentrator chambers 94, 95 have about twice the volume of the NBC adsorber chambers 83, 84 due to the increased difficulty of oxygen concentration by nitrogen adsorption. The use of a 5A molecular sieve for preferential adsorption of nitrogen is described, for example, in Sircar et al. U.S. Pat. No. 4,013,429, herein incorporated by reference.

The nitrogen is removed from the pure air to produce 95% purity oxygen at 60 psig. To remove switching valve pulsations, the oxygen is fed into a receiver 96. Then the oxygen is passed through a super HEPA filter 97 to remove adsorbent fines, bacteria, viruses, and other particulates from the oxygen.

The oxygen pressure is indicated by a gauge 98 and the oxygen purity is continuously monitored by a conventional oxygen purity sensor 99.

Oxygen from the oxygen generator 92 is directed to an oxygen distribution system generally designated 101. The oxygen distribution system has a check valve 102 for maintaining pressure and delivering oxygen to distribution lines 103, 104. The oxygen is fed to the lines 103, 104 through valves 105, 106 and pressure regulators 107, 108. To provide oxygen during maintenance or for back-up protection, high pressure oxygen bottles 109 may supply oxygen to the distribution lines 103, 104. Three bottles 109, for example, store a three to five hours reserve oxygen supply. The oxygen bottles 109 feed oxygen through a valve 110 and a pressure-dropping regulator 111.

In view of the above, pressure-swing adsorber systems have been described which possess a universality of physical adsorption of NBC agents and yet have full regeneration capability. Large-scale systems have been described for supplying air to shelters and a small-scale system has been described for the special purpose of providing medical grade oxygen. The systems are compact, energy-efficient, and highly reliable. The systems can be routinely operated on a continuous basis for full NBC protection of military facilities and vehicles.

What is claimed is:

1. A method of removing chemical and biological warfare agents from air for human consumption comprising the steps of:
    (a) compressing the air to substantially above atmospheric pressure,
    (b) purifying the compressed air in a pressure-swing adsorber of the kind having at least one adsorbent bed capable of being regenerated, said adsorbent having pores having an internal diameter substantially in excess of five Angstroms and of about ten Angstroms, and
    (c) filtering the compressed air through a filter intercepting particulates in excess of about one micrometer (1μm) in diameter.

2. The method as claimed in claim 1, wherein the compressed air is filtered both before and after being purified in said pressure-swing adsorber.

3. The method as claimed in claim 2, wherein the purified air from the pressure-swing adsorber is filtered through said filter intercepting particulates in excess of about one micrometer in diameter, and wherein the compressed air is not filtered by a filter intercepting particulates in excess of about one micrometer in diameter before being purified in the pressure-swing adsorber.

4. The method as claimed in claim 1, wherein said filter intercepts particles in excess of about one-half micrometer in diameter.

5. The method as claimed in claim 1, wherein said adsorbent is a molecular sieve.

6. The method as claimed in claim 5, wherein said molecular sieve is type 13× molecular sieve.

7. The method as claimed in claim 5, further comprising a final step of expanding the purified and filtered air so that the purified air is cooled.

8. The method as claimed in claim 5, wherein the purified and filtered air is expanded to approximately atmospheric pressure in a tubro-generator.

9. The method as claimed in claim 1, further comprising the step of passing the purified air through a carbon filter.

10. The method as claimed in claim 9, wherein said carbon filter is a high-pressure activated carbon filter.

11. The method as claimed in claim 9, further comprising the steps of sensing the presence of said chemical agents in the purified air before the purified air is passed through said carbon filter, and activating an alarm in response to said sensing of said presence of said chemical agents.

12. The method as claimed in claim 9, wherein said compressed air is selectively diverted and purified in the bed of a second pressure-swing adsorber in response to said sensing of said presence of said chemical agents.

13. The method as claimed in claim 1, wherein said pressure-swing adsorber is of the kind having at least two adsorbent beds, so that one bed is capable of being regenerated when another is purifying said compressed air.

14. The method as claimed in claim 13, wherein said pressure-swing adsorber is an industrial-type pressure-swing adsorber of the kind wherein a portion of the purified air is expanded to approximately atmospheric pressure for purging and regenerating one of the adsorbent beds without the application of heat.

15. The method as claimed in claim 1, wherein a capacitance probe is placed in said adsorbent bed for detecting a moisture front in said bed.

16. The method as claimed in claim 15, wherein a control system predicts the occurrence of breakthrough of chemical agents through the adsorbent bed ahead of said moisture front.

17. The method as claimed in claim 1, wherein the oxygen content of the compressed air purified in said pressure-swing adsorber is concentrated by passing the purified air to a second pressure-swing adsorber.

18. The method as claimed in claim 17, wherein said second pressure-swing adsorber includes at least one adsorbent bed of molecular sieve having a pore diameter of approximately five Angstroms.

19. The method as claimed in claim 18, wherein said adsorbent bed of said second pressure-swing adsorber has a substantially greater volume than the adsorbent bed of the first-mentioned adsorber purifying said compressed air.

20. The method as claimed in claim 18, wherein the compressed air being purified by the first-mentioned adsorber is at pressure substantially in excess of eighty psig, and wherein said pressure of the compressed air is dropped to about eighty psig for oxygen concentration in said second adsorber.

21. The method as claimed in claim 20, wherein the pressure of the compressed air being purified by said first-mentioned adsorber is at least about one-hundred and sixty psig.

22. A system for removing chemical and biological warfare agents from air for human consumption comprising, in combination, (a) an air compressor providing compressed air,
(b) an aerosol removal system for removing particulates from said compressed air that have a diameter in excess of a first diameter to generate a first filtered air stream,
(c) a pressure-swing adsorber system for purifying said first filtered air stream in at least one bed of molecular sieve adsorbent capable of being regenerated and having a pore size substantially in excess of five Angstroms and of about ten Angstroms to thereby generate a stream of purified air,
(d) a filter for receiving said stream of purified air and intercepting particles in excess of a second diameter, wherein one of said first and second diameters is substantially less than one micrometer ($1\mu m$), to thereby generate a stream of filtered and purified air for human consumption.

23. The system as claimed in claim 22, wherein said first diameter is substantially in excess of one micro-meter and said second diameter is about 0.5 micro-meter.

24. The system as claimed in claim 22, further comprising a carbon filter for filtering said stream of purified air, and a chemical agent vapor detector for activating an alarm in response to chemical agent vapors being detected in said stream of purified air upstream of said carbon filter.

25. The system as claimed in claim 22, wherein said air compressor is a turbo-compressor, and further comprising a turbo-expander for expanding and cooling said stream of filtered and purified air.

26. The system as claimed in claim 25, wherein said turbo-compressor is a gas turbine and heat of combustion in said gas turbine is selectively applied to said stream of filtered and purified air.

27. The system as claimed in claim 22, further comprising a regenerable pressure-swing oxygen concentrator for receiving air having been purified by said pressure-swing adsorber system, said oxygen concentrator having at least one chamber of molecular sieve adsorbent having a pore size of approximately five Angstroms.

28. The apparatus as claimed in claim 27, wherein the air received by said oxygen concentrator is at about sixty psig in said chamber, and wherein the air in said bed of said pressure-swing adsorber is at a pressure substantially in excess of sixty psig, and further comprising a regulator for dropping the pressure of the air in said chamber to about sixty psig.

* * * * *